United States Patent
Boss et al.

(10) Patent No.: US 8,014,914 B2
(45) Date of Patent: Sep. 6, 2011

(54) ENERGY AND EMISSION RESPONSIVE ROUTING FOR VEHICLES

(75) Inventors: Gregory J. Boss, Saginaw, MI (US); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 12/328,883

(22) Filed: Dec. 5, 2008

(65) Prior Publication Data

US 2010/0145609 A1    Jun. 10, 2010

(51) Int. Cl.
*G01C 21/32* (2006.01)
*G06F 19/00* (2006.01)

(52) U.S. Cl. .......... 701/22; 701/209; 701/213; 701/202; 701/123; 701/112; 701/117; 701/210; 705/317

(58) Field of Classification Search ............ 701/22, 701/100, 117, 123, 200; 705/317
See application file for complete search history.

(56) References Cited

U.S. PATENT DOCUMENTS

| | | | |
|---|---|---|---|
| 5,913,917 A | | 6/1999 | Murphy |
| 6,009,371 A * | | 12/1999 | Kobayashi ............. 701/112 |
| 6,188,957 B1 * | | 2/2001 | Bechtolsheim et al. ...... 701/209 |
| 6,990,401 B2 | | 1/2006 | Neiss et al. |
| 2006/0015249 A1 * | | 1/2006 | Gieseke ................ 701/210 |
| 2006/0247852 A1 * | | 11/2006 | Kortge et al. ........... 701/209 |
| 2006/0278449 A1 * | | 12/2006 | Torre-Bueno ........... 180/65.2 |
| 2007/0010933 A1 * | | 1/2007 | Hochkirchen et al. ...... 701/117 |
| 2007/0017719 A1 | | 1/2007 | Patel |
| 2007/0113697 A1 | | 5/2007 | Youn |
| 2007/0208467 A1 | | 9/2007 | Maguire et al. |
| 2007/0294026 A1 * | | 12/2007 | Schirmer .............. 701/202 |
| 2008/0125958 A1 | | 5/2008 | Boss et al. |
| 2008/0133120 A1 * | | 6/2008 | Romanick ............. 701/123 |
| 2008/0148993 A1 * | | 6/2008 | Mack ................. 105/35 |
| 2009/0005965 A1 * | | 1/2009 | Forstall et al. .......... 701/201 |
| 2009/0146846 A1 * | | 6/2009 | Grossman ............. 340/988 |
| 2010/0174484 A1 | | 7/2010 | Sivasubramaniam et al. ............. 701/213 |
| 2011/0022527 A1 * | | 1/2011 | Onishi et al. ........... 705/317 |

* cited by examiner

*Primary Examiner* — Vivek D Koppikar
*Assistant Examiner* — Jonathan K Ng
(74) *Attorney, Agent, or Firm* — Patrick J. Daugherty; Driggs, Hogg, Daugherty & Del Zoppo Co., LPA

(57) ABSTRACT

Methods, including service methods, articles of manufacture, systems, articles and programmable devices are provided for vehicle route planning as a function of vehicle type. A plurality of different routes for travel by a vehicle from a trip origin to a destination is determined, and the vehicle identified as either an internal combustion engine vehicle type or a hybrid vehicle type. A programmable device is caused to recommend a route of the determined plurality of routes to an operator of the identified vehicle as a function of the identified vehicle type, wherein a route recommended to the identified internal combustion engine vehicle type is different from a route recommended to the identified hybrid vehicle type. In some examples, identifying the vehicle as configured to generate operative energy through a regenerative braking energy component results in recommending a route will cause more breaking over a faster route.

18 Claims, 3 Drawing Sheets

ENERGY AND EMISSION RESPONSIVE ROUTING FOR VEHICLES

FIELD OF THE INVENTION

The present invention generally describes methods, systems and devices for decreasing fuel energy use and associated emissions of a vehicle by providing route planning as a function of vehicle fuel energy and non-fuel energy usage characteristics.

BACKGROUND OF THE INVENTION

The worldwide use of automobiles, trucks and other internal combustion engine vehicles is believed to cause significant environmental damage. In one estimate, 590 million passenger vehicles operating worldwide consume an average of 550 gallons of gasoline per year, resulting in a worldwide consumption of 324,500,000,000 gallons of gasoline per year. It is also estimated that each vehicle exhausts on a yearly basis an average of 80 pounds of smog-causing hydrocarbons, 606 pounds of carbon monoxide, 41 pounds of nitrogen oxide (which causes acid rain and contributes to smog) and 10,000 pounds of carbon dioxide (which is believed to cause global climate change).

Hybrid electric vehicles (HEV) use multiple distinct power sources to propel the vehicle, generally including a combustion engine power source (e.g. a gasoline, diesel or biofuel engine), as well as an on-board no-emission/exhaust or low-emission/exhaust "green" power source. Illustrative but not exhaustive examples include hybrid green sources, rechargeable electrical energy storage and drive systems, natural gas systems, hydrogen fuel cell systems, compressed air systems and solar energy systems, though others will be apparent to one skilled in the art. Although use of an on-board no-emission green energy source to propel the hybrid generally results in little or no direct harmful emissions or non-renewable fuel source use, hybrids must still generally use their combustion engine power sources as well in order to accomplish some trips, thus still resulting in the generation of vehicle exhaust and/or the consumption of non-renewable fuel resources.

SUMMARY OF THE INVENTION

Methods are provided for vehicle route planning as a function of vehicle type. A plurality of different routes for travel by a vehicle from a trip origin to a destination is determined, and the vehicle identified as either an internal combustion engine vehicle type or a hybrid vehicle type. A programmable device recommends a route of the determined plurality of routes to an operator of the identified vehicle as a function of the identified vehicle type, wherein a route recommended to an internal combustion engine vehicle type is different from a route recommended to a hybrid vehicle type.

Service methods are also provided, wherein a service provider deploys a computational device infrastructure configured to determine the plurality of different routes for travel and to identify the vehicle as either the internal combustion engine vehicle type or a hybrid vehicle type configured to generate operative energy through a regenerative braking energy component. The computational device infrastructure is further configured to determine that traveling a first route will result in a faster total travel time and that traveling a second route will cause more breaking by the vehicle relative to traveling the first route, and responsively recommend the first route over the second route to an operator of an identified internal combustion engine vehicle type and recommend the second route over the first route to an operator of an identified hybrid vehicle type as a function of the more braking determination.

Methods also include producing computer executable program code, storing the code on a computer readable medium and providing the program code to be deployed and executed on a computer system. The code causes a computer system to determine a plurality of different routes for travel by a vehicle from a trip origin to a destination, identify the vehicle as either an internal combustion engine vehicle type or a hybrid vehicle type, and recommend one of the determined of routes to an operator of the identified vehicle as a function of the identified type. More particularly, a route recommended to an identified internal combustion engine vehicle type is different from a route recommended to an identified hybrid vehicle type.

Apparatuses, articles and programmable devices are also provided. Some devices include processing means, memory in communication with the processing means; and a network interface in communication with the processing means and the memory. Device processing means are configured to determine a plurality of different routes for travel by a vehicle from a trip origin to a destination and identify the vehicle as either an internal combustion engine vehicle type or a hybrid vehicle type configured to generate operative energy through a regenerative braking energy component. The device processing means are also configured to determine that traveling a first route will result in a faster total travel time to the destination relative to traveling a second route and determine that traveling the second route will cause more breaking by the vehicle relative to traveling the first route, and further to responsively recommend the first route over the second route to an operator of the identified internal combustion engine vehicle type as a function of the faster total travel time, and recommend the second route over the first route to an operator of the identified hybrid vehicle as a function of the more braking determination.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

Figure 1:
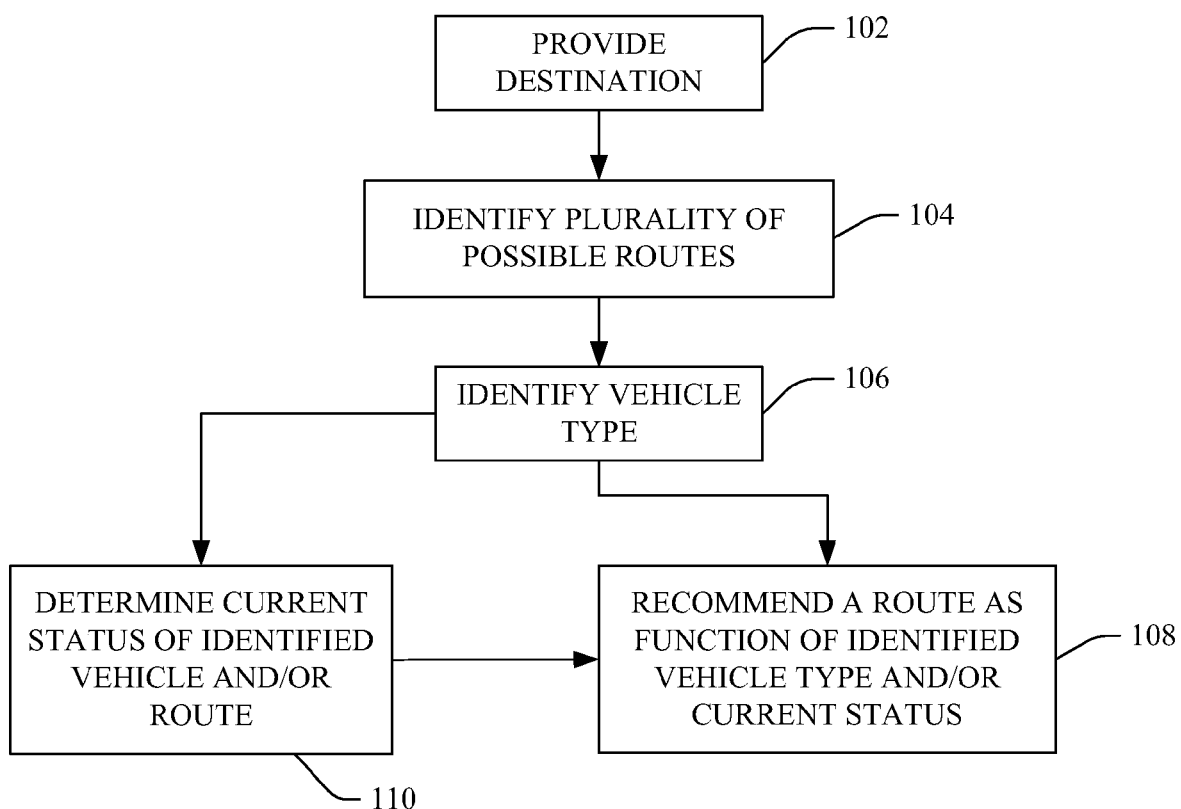
FIG. 1 is a flow chart illustrating a method and system for vehicle route planning as a function of vehicle type according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience the Detailed Description of the Invention has the following sections:
I. General Description; and
II. Computerized Implementation.

I. General Description

FIG. 1 is a flow chart illustrating a method and system for vehicle route planning as a function of vehicle type according to the present invention. At 102 a destination is provided, and at 104 a plurality of different possible routes are identified for travel by a vehicle from a trip origin (e.g. a specified origin or a current location of the vehicle, in some examples as determined by global positioning satellite (GPS) system component) to the destination. At 106 the type of vehicle is identified, and more particularly as either an internal combustion engine vehicle type or a hybrid vehicle type. At 108 a route of the plurality of routes is recommended to an operator of the identified vehicle as a function of the identified type, wherein a route recommended to an identified internal combustion engine vehicle type is different from a route recommended to an identified hybrid vehicle type.

In one embodiment of the present invention, identifying the vehicle type as a hybrid comprises identifying the vehicle as a hybrid vehicle configured to generate operative energy through a regenerative braking energy component. Regenerative braking energy components are generally used with electrical energy storage and drive systems, though they may be used to create energy for use with other green sources (e.g. to create potential hydrogen fuel cell energy form constituent elements and components, to compress gas to use with a compressed gas drive, etc.). Thus, it will be understood that the present invention is not limited to hybrids incorporating electrical energy drives, but may also be applied with other green energy sources that provide an alternative to internal combustion engines.

With respect to utilizing regenerative braking energy components, embodiments of the present invention estimate or determine braking characteristics of possible routes; for example, estimating or determining that traveling a first of the identified destination routes will result in a faster total travel time to the destination relative to traveling a second of the plurality of routes, wherein traveling the second route will cause more breaking by the vehicle relative to traveling the first route. Accordingly, recommending a route as a function of vehicle type then comprises recommending the first route over the second route to an operator of an identified internal combustion engine vehicle type for traveling to the trip destination as a function of the faster total travel time, and instead recommending the second route over the first route to an operator of the identified hybrid vehicle for traveling to the same trip destination as a function of the more braking determination.

In one aspect, fuel consumed by hybrids and other vehicles are commonly derived from non-renewable resource, and furthermore exhaust from burning fuels to provide operative energy to said vehicles may be damaging to the environment. Thus, it is desired to develop systems and methods that permit and encourage hybrid drivers and other operators to use fuel more efficiently and more specifically to maximize the use of renewable and low or non-emission electric power and minimize fuel use in providing operative energy to move the hybrid to a destination. Many approaches exist for decreasing the energy use of vehicles and promoting environmental stewardship. For example, consumers may purchase fuel efficient vehicles and hybrids, adopt efficient driving habits, and ensure proper maintenance of their vehicle. However, problems arise in utilizing prior art routing solutions for hybrid vehicles, some of which may even be deleterious to efficient energy and emission profiles for the hybrid.

For example, prior art route planning is usually a function of time or distance, generally selecting and recommending the fastest or shortest routes to maximize convenience to the vehicle operator, and in some aspects also to reduce the use of fuel for a conventional combustion engine vehicle in reaching a destination (as shorter travel times and distance generally require less fuel or generate less emissions). However, such approaches and prior art actually teach away from determining the most fuel efficient routes for a hybrid vehicle. In contrast, stop-and-go routes are recommended for hybrid vehicles according to the present invention over faster routes, taking advantage of incorporated regenerative braking energy systems to reach a destination more efficiently. For example, there may be two potential routes from a first location to a second location or destination. A first of the potential routes may require a longer driving distance (e.g. 15 miles) but utilizes more high-speed highway driving than the second potential route, which instead requires driving for only 12 miles but contains stop-and-go driving through one or more congested, high-traffic and slower speed urban secondary roads. Under the prior art, the quicker and less stop-and-go first route would be recommended to both conventional and hybrid vehicles, in one aspect to minimize fuel use and emissions for the conventional vehicle, to provide convenience and minimize operating time (and associated recharging demands) for the hybrid vehicle. However, according to the present invention, routing methods are modified as a function of distinguishing between hybrids and internal combustion vehicles, thus recommending the faster/longer/high-way speed first route for a conventional internal combustion cars and instead the stop-and-go route for a hybrid.

Identifying a given route as a "more braking" route according to the present invention may comprehend a variety of factors and observations. For example, referring again to FIG. 1 at 110, traffic information may be analyzed and used in routing decisions. According to the present invention, it may be more efficient to route a hybrid vehicle into a semi-congested route rather than a freeway, which is unambiguously opposite to the teachings and functioning of prior art routing logic. Illustrative but not exhaustive examples of positive indications for hybrid routing include stop-and-go traffic, high traffic and congested road observations (congested roads will often necessitate a change in speed coupled with frequent braking); more enforced traffic control items (e.g. stop signs, traffic lights, yield signs, etc.) than another route; and more turns, as more turns may cause a hybrid to engage in more breaking and thus more regenerative energy creation.

In another aspect, route speed characteristics may be considered in view of optimal speed limits for a vehicle type. More particularly, a fast route may not be the most efficient for a hybrid vehicle, as each hybrid vehicle may have a speed at which an internal combustion engine is required to engage to provide sufficient operative power to maintain the speed or otherwise successfully reach the destination. For example, a hybrid vehicle configured to store and use generated, operative electrical energy through a storage battery may have a threshold speed beyond which the combustion engine must be engaged to provide operative energy for traveling. In another example, a threshold speed may be a speed at which the hybrid vehicle can generate enough energy by braking through the regenerative braking energy component to provide operative energy for traveling and avoid engaging the internal combustion engine power source.

Route selection may be conditional, for example on achieving a minimum benefit in exchange for increasing travel times. Thus, in one embodiment, recommending a slower route may be conditional on estimating that traveling the slower route will add no more than a maximum additional time value to a total travel time of another faster route to the same destination, or that traveling the slower route will conserve a minimum amount of fuel relative to traveling the faster route.

Route selection may also be a function of vehicle system and component status and requirements. In one embodiment, storage battery power levels or other status is monitored (e.g. at 110, FIG. 1), automatically triggering a reroute when battery power level is low as compared to a low condition threshold; rerouting the hybrid vehicle to another route may include selecting another route having a lower total travel time to the destination, a proximity to a storage battery recharging station, and a proximity to a renewable fuel filling station (e.g. hydrogen fuel cell fuel, bio-diesel, etc.).

Other factors may also be considered that may be common to improving efficiencies and reducing emissions in both internal combustion and hybrid vehicles. For example, route topography and elevations may also be considered, with routes having lesser elevation gains preferred for both types of vehicles in order to minimize or avoid using combustion engines. Thus, in one embodiment, two routes that will cause more breaking by a hybrid vehicle over a faster route may be further distinguished and selected over each other and the faster route as a function of selecting the route with both more braking and less upward elevation change.

Figure 2:
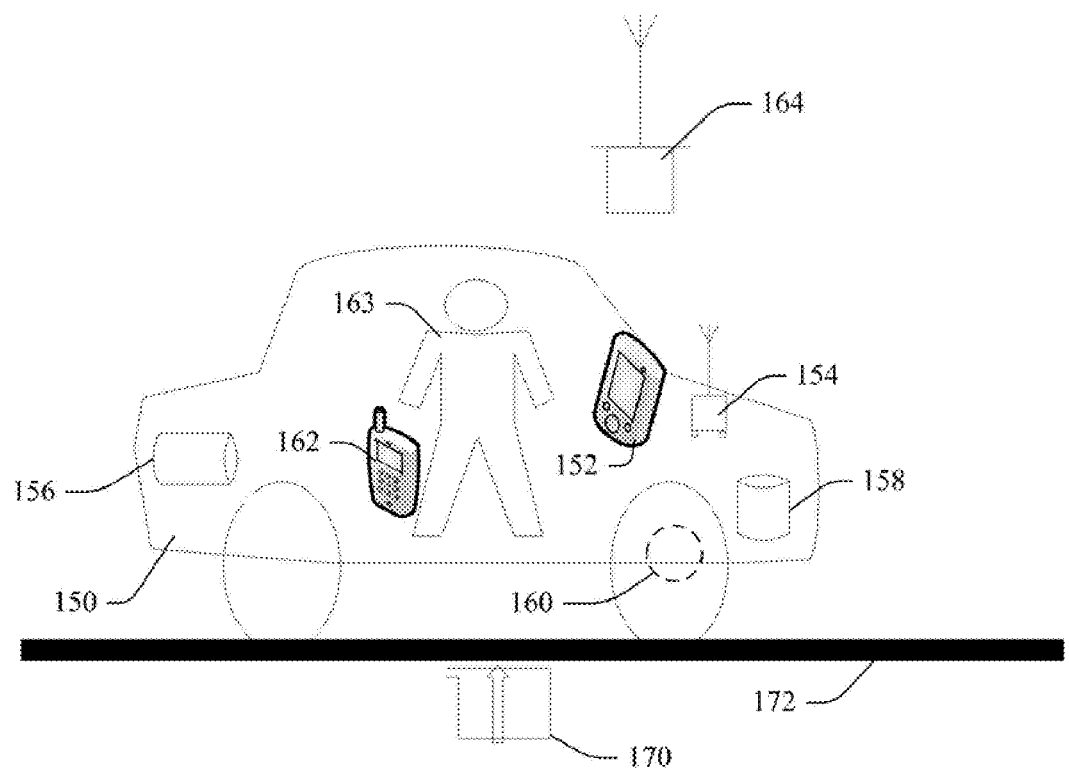
FIG. 2 is diagrammatic illustration of an implementation of a method and system for route planning for a hybrid vehicle according to the present invention.

In another aspect, routing according to the present invention may utilize observations, data and inputs from both internal and external vehicle systems, and of roads and infrastructure of identified routes, and periodically updating and recalculate routing and recommendations, for example to determine optional fuel efficient routing based on changes to data collected (e.g. at 108 and 110, FIG. 1). FIG. 2 illustrates a hybrid vehicle 150 configured according to the present invention. The vehicle includes a GPS-based route planner 152 attached to the dashboard or built into the vehicle, the planner in a wired or wireless communication with a hybrid vehicle computer system 154. Communication between the route planner 152 and the hybrid computer 154 enables a planner 152 routing program or application to receive current vehicle data or variables useful in selecting routes, for example as described above, and illustrative but not exhaustively including remaining fuel (e.g. gas, diesel, bio-fuel, hydrocarbon compounds used to provide hydrogen for fuel cell technology, etc.) in a fuel tank 156; remaining potential energy, e.g. as stored in a hybrid battery 158; average regenerative breaking by a regenerative braking component 160 over one or more specified time periods; average speed of the vehicle 150 over one or more specified time periods; heat of the regenerative braking component 160 (e.g. to determine overheating requiring a rerouting as discussed above); and current characteristics of the hybrid vehicle 150 (e.g. type of fuel in the fuel tank 156, regenerative breaking system capabilities and parameters, speed at which an internal combustion engine turns on, speed at which the battery 158 can be regenerated by the braking system 160, etc.). The above route processes may also be performed by a portable programmable device 162, for example a personal digital assistant (PDA) or cellular device carried by a vehicle occupant 163 and configured to communicate with the hybrid computer system 154.

The route planning device 152/162 is also configured to acquire data and inputs external to the vehicle 150, for example real-time traffic conditions, route detours, etc. wirelessly from a service provider 164 (e.g. a toll road information broadcaster 164, a broadcast or internet-based traffic and weather alert service 164, etc.), or in some examples directly from road transponders 170 provided along a toll road 172. In some embodiments, carbon offsetting may also be effected as a function of route selection and use. For example, an entity (e.g. private company or employer, organization, etc.) may plant a tree or prevent destruction of a tree in a rain forest if a vehicle driver selects a route that is not optimal (i.e. goes against the recommended route choice), in some embodiments as a function of selecting and/or taking a specific route proximate to a location of the entity; additionally, such offsetting may also be accomplished by the entity if the route is the recommended/most fuel efficient for the vehicle. The company may be notified of the selection and/or route traveling by real-time and/or wireless means through a communication node 164, for example through a GPS, wireless fidelity (WiFi) or cellular communication with a routing device 152/162 device associated with the vehicle or through other networking and communicating devices. Routing and other mapping in embodiments of the present invention may be achieved through simple, extant topographical maps as well as through GPS device or on-line mapping services (e.g. Mapquest® or Google Maps™; MAPQUEST is a trademark of MapQuest.com, Inc. in the United States or other countries, and GOOGLE MAPS is a trademark of Google Technology, Inc. in the United States or other countries).

Figure 3:
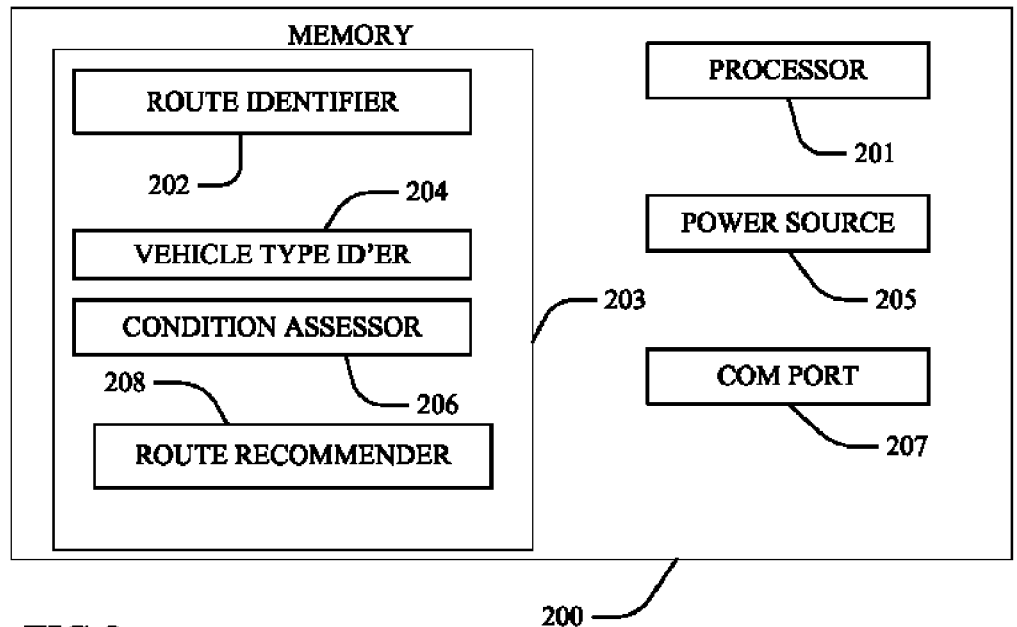
FIG. 3 is a block diagram of a system or device configured to plan routes as a function of vehicle type according to the present invention.

FIG. 3 illustrates a programmable device or module 200 configured to plan routes as a function of vehicle type according to the present invention, for example as illustrated in FIGS. 1 and 2 and described above. The device 200 may be incorporated into a larger system (such as one provided by a service provider) wherein other applications and components of the larger system accomplish systems and methods according to the present invention, or it may be a stand-alone device or module 200 configured to perform each of the systems and methods described above. The present embodiment comprises a central processing unit (CPU) or other processing means 201 in communication with a memory 203 comprising logic components that enable the CPU 201 to perform processes and methods according to the present application, as will be understood through reference to FIGS. 1 and 2 as discussed above. Thus, the memory 203 comprises a route identifier logic component 202 configured to determine possible routes to a destination; a vehicle type identifier ("ID'er") logic component 204 configured to identify and distinguish hybrid and internal combustion vehicle systems and operating parameters; a current condition assessor logic component 206 configured to determine and provide data regarding current route and vehicle status (e.g. battery level, speeds, traffic, etc.) and a route recommender logic component 208 configured to utilize determinations and data from the other logic components 202, 204 and 206 and select an efficient and/or low emission route as a function of vehicle type and/or current data.

A power source 205 is configured to provide operative power to the device 200; examples include battery units 205 and power inputs configured to receive alternating or direct current electrical power, and other appropriate power units 205 will be apparent to one skilled in the art. A communication port or network link/node means ("com port") 207 is also provided and configured to enable data and other communications as may be appropriate, for example as discussed above.

II. Computerized Implementation

Figure 4:
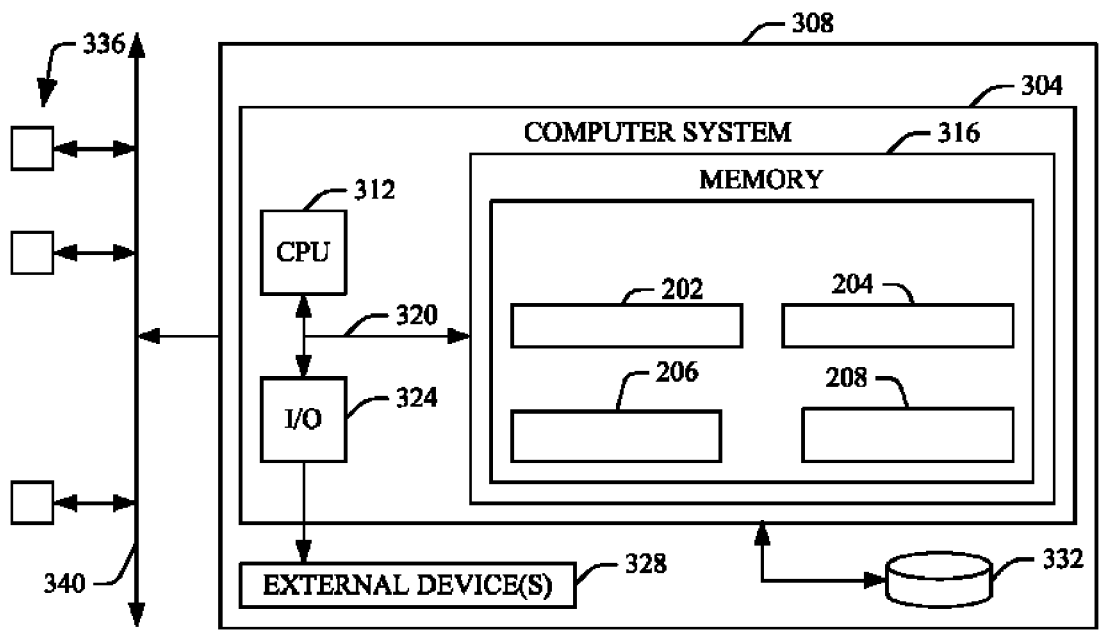
FIG. 4 is a block diagram illustrating a computerized implementation of a method and system for vehicle route planning as a function of vehicle type according to the present invention.

Referring now to FIG. 4, an exemplary computerized implementation of the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and systems, and devices as illustrated in FIGS. 1-3 and described above, including the route identifier logic component 202, the vehicle type identifier logic component 204, the current condition assessor logic component 206 and the route recommender logic component 208 discussed above, and which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboards, pointing devices, displays, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1-4 above and described otherwise herein. To this extent, the computer-readable/useable medium includes program code that implements each of the various process steps of the present application.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary," an "another", etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for vehicle route planning as a function of vehicle type, comprising:
    determining a plurality of different routes for travel by a vehicle from a trip origin to a destination;
    identifying the vehicle as a hybrid vehicle type that generates operative energy through a regenerative braking energy component or an internal combustion engine vehicle type;
    recommending via a programmable device a route of the plurality of routes to an operator of the identified vehicle as a function of the identified vehicle type by:
    determining that traveling a first route of the plurality of routes will result in a faster total travel time to the destination relative to traveling a second route of the plurality of routes;
    determining that traveling the second route will cause more braking by the vehicle relative to traveling the first route;
    recommending the first route over the second route to an operator of the identified internal combustion engine vehicle type for traveling to the trip destination as a function of the faster total travel time;
    recommending the second route over the first route to an operator of the identified hybrid vehicle for traveling to the trip destination as a function of the more braking determination; and
    wherein a route recommended to the identified internal combustion engine vehicle type is different from a route recommended to the identified hybrid vehicle type.

2. The method of claim 1, wherein the identified vehicle is the hybrid vehicle, further comprising:
    determining that traveling over the first route and the second route will each result in a faster total travel time for the hybrid vehicle to the destination than traveling over a third route of the route plurality;
    determining that traveling the third route will cause more braking by the hybrid vehicle than traveling the first route and less upward elevation change relative to traveling the second route; and
    recommending the third route over the first route and the second route to an operator of the hybrid vehicle for traveling to the trip destination as a function of the more braking and the less upward elevation change determination.

3. The method of claim 1 wherein the determining that traveling the second route will cause more braking by the vehicle than traveling the first route comprises determining that the second route has more turns than the first route.

4. The method of claim 1, wherein the identified vehicle is the hybrid vehicle, the hybrid vehicle configured to store and use generated operative energy through a storage battery, further comprising:
    comparing a power level of the storage battery to a low condition threshold;
    rerouting the hybrid vehicle to another route of the plurality of routes from a current route automatically when battery power level is lower than the low condition threshold, the another route having at least one of:
    a lower total travel time to the destination;
    a proximity to a storage battery recharging station; and
    a proximity to a renewable fuel filling station.

5. The method of claim 1, further comprising conditioning recommending the second route over the first route to the identified hybrid vehicle for traveling to the trip destination upon at least one of:
    estimating that traveling the second route will add no more than a maximum additional time value to a total travel time of the first route to the destination; and
    estimating that traveling the second route will conserve a minimum amount of fuel relative to traveling the faster first route.

6. The method of claim 1, wherein the identified vehicle is the hybrid vehicle, further comprising:
    determining an overheating of a braking system of the hybrid vehicle; and
    rerouting the hybrid vehicle from a current route automatically to another route of the plurality of routes having less stop-and-go traffic until the braking system overheating abates.

7. The method of claim 1 wherein determining that traveling the second route will cause more braking by the vehicle than traveling the first route comprises determining that the second route has a stop-and-go traffic pattern.

8. The method of claim 7 wherein determining that the second route has a stop-and-go traffic pattern comprises determining that the second route has more enforced traffic control items than the first route.

9. The method of claim 7 wherein determining that the second route has a stop-and-go traffic pattern comprises determining that the second route has more congested traffic than the first route.

10. The method of claim 1, wherein the identified vehicle is the hybrid vehicle, the hybrid vehicle is configured to store and use generated operative energy through a storage battery, further comprising:
   determining that traveling the first route and the second route will each will result in a faster total travel time for the hybrid vehicle to the destination than traveling over a third route of the route plurality and that traveling the third route will cause more braking by the hybrid vehicle than traveling the first route;
   determining that the third route has an average speed limit lower than a threshold speed and that the second route has an average speed limit greater than or equal to the threshold speed; and
   recommending the third route over the first route and the second route for traveling to the trip destination as a function of the more braking and the average speed limit determining.

11. The method of claim 10 wherein the threshold speed is a speed at which the hybrid vehicle is configured to engage an internal combustion engine power source to provide operative energy for traveling.

12. The method of claim 10 wherein the threshold speed is a speed at which the hybrid vehicle can generate energy by the determined third route braking through the regenerative braking energy component to provide operative energy for traveling and avoid engaging the internal combustion engine power source.

13. The method of claim 1, further comprising effecting a carbon offset automatically in response to an operator of the identified vehicle overriding the first route recommending or the second route recommending by selecting another of the plurality of routes.

14. The method of claim 13, further comprising an entity effecting the carbon offsetting as a function of the identified vehicle traveling proximate to a physical location of the entity on the selected first route.

15. The method of claim 1, further comprising a service provider deploying a computational device infrastructure comprising the programmable device, wherein the computational device infrastructure is configured to:
   determine the plurality of different routes for travel;
   identify the vehicle as either the internal combustion engine vehicle type or the hybrid vehicle type configured to generate operative energy through a regenerative braking energy component;
   determine that traveling the first route will result in a faster total travel time to the destination relative to traveling the second route;
   determine that traveling the second route will cause more braking by the vehicle relative to traveling the first route;
   recommend the first route over the second route to an operator of the identified internal combustion engine vehicle type for traveling to the trip destination as the function of the faster total travel time; and
   recommend the second route over the first route to an operator of the identified hybrid vehicle for traveling to the trip destination as the function of the more braking determination.

16. The method of claim 15, wherein the computational device infrastructure is configured to determine that traveling the second route will cause more braking by the vehicle than traveling the first route by determining that the second route has more turns than the first route.

17. A method for vehicle route planning as a function of vehicle type, comprising:
   producing computer executable program code;
   storing the code on a computer readable medium;
   providing the program code to be deployed and executed on a computer system,
   the program code causing the computer system to:
   determine a plurality of different routes for travel by a vehicle from a trip origin to a destination;
   identify the vehicle as either a hybrid vehicle type that generates operative energy through a regenerative braking energy component or an internal combustion engine vehicle type;
   recommend a route of the plurality of routes to an operator of the identified vehicle as a function of the identified type by:
   determining that traveling a first route of the plurality of routes will result in a faster total travel time to the destination relative to traveling a second route of the plurality of routes;
   determining that traveling the second route will cause more braking by the vehicle relative to traveling the first route;
   recommending the first route over the second route to an operator of the identified internal combustion engine vehicle type for traveling to the trip destination as a function of the faster total travel time;
   recommending the second route over the first route to an operator of the identified hybrid vehicle for traveling to the trip destination as a function of the more braking determination; and
   wherein a route recommended to the identified internal combustion engine vehicle type is different from a route recommended to the identified hybrid vehicle type.

18. A programmable device comprising:
   a processing means;
   a memory in communication with the processing means; and
   a network interface in communication with the processing means and the memory;
   wherein the processing means is configured to:
   determine a plurality of different routes for travel by a vehicle from a trip origin to a destination;
   identify the vehicle as either an internal combustion engine vehicle type or a hybrid vehicle type configured to generate operative energy through a regenerative braking energy component;
   determine that traveling a first route of the route plurality will result in a faster total travel time to the destination relative to traveling a second route of the route plurality;
   determine that traveling the second route will cause more braking by the vehicle relative to traveling the first route;
   recommending the first route over the second route to an operator of the identified internal combustion engine vehicle type for traveling to the trip destination as a function of the faster total travel time; and
   recommend the second route over the first route to an operator of the identified hybrid vehicle for traveling to the trip destination as a function of the more braking determination.

* * * * *